US012572467B2

(12) United States Patent
    Um

(10) Patent No.:     US 12,572,467 B2
(45) Date of Patent:        Mar. 10, 2026

(54) MEMORY DEVICE AND STORAGE DEVICE

(71) Applicant: SK hynix Inc., Gyeonggi-do (KR)

(72) Inventor: Gi Pyo Um, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/912,592

(22) Filed: Oct. 11, 2024

(65) Prior Publication Data

US 2025/0378022 A1      Dec. 11, 2025

(30) Foreign Application Priority Data

Jun. 10, 2024     (KR) ........................ 10-2024-0074694

(51) Int. Cl.
    *G06F 12/02*        (2006.01)
    *G06F 13/16*        (2006.01)
(52) U.S. Cl.
    CPC ...... *G06F 12/0246* (2013.01); *G06F 13/1668* (2013.01)
(58) Field of Classification Search
    CPC ........................ G06F 12/0246; G06F 13/1668
    See application file for complete search history.

(56) References Cited

U.S. PATENT DOCUMENTS

| | | | | |
|---|---|---|---|---|
| 10,360,155 | B1 * | 7/2019 | Thomas ................ | G06F 3/0649 |
| 2018/0024919 | A1 * | 1/2018 | Geml .................... | G06F 3/0659 |
| | | | | 711/103 |
| 2019/0370169 | A1 * | 12/2019 | Amato ................ | G06F 12/1018 |
| 2021/0382819 | A1 * | 12/2021 | You ..................... | G06F 13/1673 |
| 2021/0397375 | A1 * | 12/2021 | Kuo ........................ | G06F 3/0652 |
| 2022/0261153 | A1 * | 8/2022 | Papa .................... | G06F 3/0652 |
| 2023/0068089 | A1 * | 3/2023 | Choi ....................... | G06F 3/065 |
| 2024/0232093 | A1 * | 7/2024 | Lee ..................... | G06F 12/0246 |
| 2024/0345727 | A1 * | 10/2024 | He ...................... | G06F 3/0608 |
| 2024/0394155 | A1 * | 11/2024 | Lee .......................... | G06F 1/30 |
| 2025/0068336 | A1 * | 2/2025 | Lee ........................ | G06F 3/0679 |

FOREIGN PATENT DOCUMENTS

| | | | |
|---|---|---|---|
| KR | 10-2012-0102923 A | | 9/2012 |
| KR | 10-2021-0001206 A | | 1/2021 |

* cited by examiner

*Primary Examiner* — Tasnima Matin
(74) *Attorney, Agent, or Firm* — IP & T GROUP LLP

(57)     ABSTRACT

In an embodiment of the present disclosure, a data copy command of a host device may be processed without moving data in a memory by updating mapping information using a first mapping table between first logical block addresses and physical block addresses and a second mapping table between second logical block addresses and temporary logical block addresses corresponding to the first logical block addresses, whereby it is possible to improve the efficiency of processing the copy command.

20 Claims, 12 Drawing Sheets

Mapping Table 2

| LBA2 | TLBA |
|---|---|
| LBA2 #0 | . . . |
| LBA2 #1 | . . . |
| LBA2 #2 | . . . |
| LBA2 #3 | . . . |
| LBA2 #4 | . . . |
| LBA2 #5 | . . . |
| LBA2 #6 | . . . |
| LBA2 #7 | . . . |
| ⋮ | |
| LBA2 #9997 | . . . |
| LBA2 #9998 | . . . |
| LBA2 #9999 | . . . |
| LBA2 #10000 | . . . |

Mapping Table 1

| LBA1 | PBA |
|---|---|
| LBA1 #0 | . . . |
| LBA1 #1 | . . . |
| LBA1 #2 | . . . |
| LBA1 #3 | . . . |
| LBA1 #4 | . . . |
| LBA1 #5 | . . . |
| LBA1 #6 | . . . |
| LBA1 #7 | . . . |
| ⋮ | |
| LBA1 #9997 | . . . |
| LBA1 #9998 | . . . |
| LBA1 #9999 | . . . |
| LBA1 #10000 | . . . |

110

| | Memory |
|---|---|
| PBA #0 | Storage Region #0 |
| PBA #1 | Storage Region #1 |
| PBA #2 | Storage Region #2 |
| PBA #3 | Storage Region #3 |
| | ⋮ |

FIG.3

Mapping Table 2

| LBA2 | TLBA |
|---|---|
| LBA2 #0 | ... |
| LBA2 #1 | ... |
| LBA2 #2 | ... |
| LBA2 #3 | ... |
| LBA2 #4 | ... |
| LBA2 #5 | ... |
| LBA2 #6 | ... |
| LBA2 #7 | ... |
| ... | |
| LBA2 #9997 | ... |
| LBA2 #9998 | ... |
| LBA2 #9999 | ... |
| LBA2 #10000 | ... |

Mapping Table 1

| LBA1 | PBA |
|---|---|
| LBA1 #0 | ... |
| LBA1 #1 | ... |
| LBA1 #2 | ... |
| LBA1 #3 | ... |
| LBA1 #4 | ... |
| LBA1 #5 | ... |
| LBA1 #6 | ... |
| LBA1 #7 | ... |
| ... | |
| LBA1 #9997 | ... |
| LBA1 #9998 | ... |
| LBA1 #9999 | ... |
| LBA1 #10000 | ... |

Memory 110

| | |
|---|---|
| PBA #0 | Storage Region #0 |
| PBA #1 | Storage Region #1 |
| PBA #2 | Storage Region #2 |
| PBA #3 | Storage Region #3 |
| | ... |

*FIG.10*

MEMORY DEVICE AND STORAGE DEVICE

CROSS-REFERENCE TO RELATED APPLICATION

The present application claims priority under 35 U.S.C. § 119 (a) to Korean Patent Application No. 10-2024-0074694 filed on Jun. 10, 2024, which is incorporated herein by reference in its entirety.

BACKGROUND

1. Technical Field

Embodiments of the present disclosure relate to a memory device and a storage device.

2. Related Art

A storage device may include at least one memory which stores data. The storage device may include a controller which controls the operation of the at least one memory.

The controller may control the operation of the memory based on a command received from an external device or its own command. For example, the controller may control an operation of writing data to the memory or reading data written in the memory. As the case may be, the controller may control an operation of copying data written in a particular region of the memory to another region of the memory.

Due to the internal operation of the storage device controlled by the controller, a time required to process a command from the external device may increase, and the operation performance of the storage device may deteriorate.

SUMMARY

Various embodiments of the present disclosure are directed to providing measures capable of improving the operation performance of a storage device by reducing a time required to process a command received by the storage device from an external device and increasing the lifespan of a memory included in the storage device.

In an embodiment of the present disclosure, a storage device may include a memory including a plurality of storage regions, the plurality of storage regions corresponding to physical block addresses, respectively; and a controller configured to update a first mapping table and a second mapping table, the first mapping table including mapping information between first logical block addresses and the physical block addresses, the second mapping table including mapping information between second logical block addresses and temporary logical block addresses corresponding to the first logical block addresses of the first mapping table, determine a physical block address corresponding to the host logical block address by comparing the host logical block address according to an operation command received from a host device with at least one of the first logical block addresses of the first mapping table or the second logical block addresses of the second mapping table, and perform an operation according to the operation command based on the physical block address.

In an embodiment of the present disclosure, a memory device may include a data storage region indicated by physical block addresses; and a mapping table storage region distinguished from the data storage region, and configured to store a first mapping table and a second mapping table, the first mapping table including mapping information between first logical block addresses and the physical block addresses, the second mapping table including mapping information between second logical block addresses and temporary logical block addresses corresponding to the first logical block addresses of the first mapping table.

In an embodiment of the present disclosure, a storage device may include a first memory including storage regions corresponding to physical block addresses; a second memory; and a controller configured to read, from the first memory, a first mapping table and a second mapping table, the first mapping table including mapping information between first logical block addresses and the physical block addresses, the second mapping table including mapping information between second logical block addresses and temporary logical block addresses corresponding to the first logical block addresses of the first mapping table, load the first mapping table and the second mapping table in the second memory, determine a physical block address corresponding to the external logical block address by comparing an external logical block address according to an external command with at least one of the first logical block addresses of the first mapping table or the second logical block addresses of the second mapping table, and process the external command based on the physical block address.

According to the embodiments of the present disclosure, when a storage device processes a command received from an external device, by efficiently performing an operation inside the storage device, it is possible to improve the operation performance of and increase the lifespan of the storage device.

BRIEF DESCRIPTION OF THE DRAWINGS

FIG. 3 is a diagram illustrating structures of mapping tables managed in the storage device according to an embodiment of the present disclosure.

FIG. 10 is a diagram illustrating a method in which mapping tables are managed in the storage device according to an embodiment of the present disclosure.

DETAILED DESCRIPTION

Figure 1:
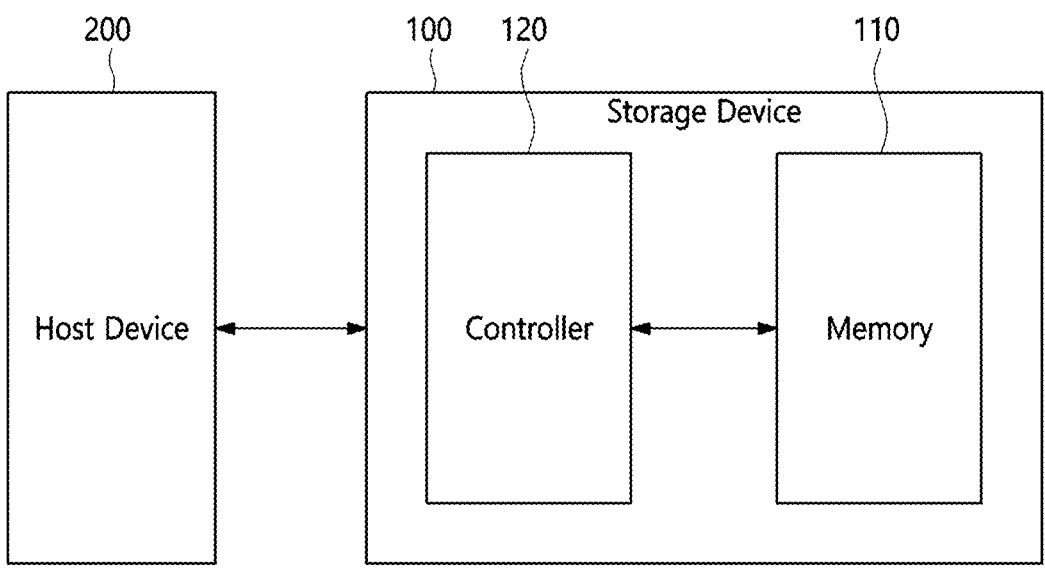
FIG. 1 is a diagram illustrating a schematic configuration of a storage device based on an embodiment of the present disclosure.

In the following description of embodiments of the present disclosure, reference will be made to the accompanying drawings in which it is shown by way of illustration specific embodiments that can be implemented, and in which the same reference numerals and signs can be used to designate the same or like components even when they are shown in different accompanying drawings from one another. Further, in the following description of embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all meanings of the term "can."

Hereinafter, various embodiments of the present disclosure will be described in detail with reference to accompanying drawings.

FIG. 1 is a diagram illustrating an example of the schematic configuration of a storage device 100 according to an embodiment of the present disclosure.

Referring to FIG. 1, the storage device 100 according to an embodiment of the present disclosure may include at least one memory 110. The storage device 100 may include a controller 120 which controls the operation of the memory 110.

The memory 110 may be, for example, volatile memory such as DRAM, SDRAM, DDR SDRAM and LPDDR SDRAM, but the embodiments of the present disclosure are not limited thereto. The memory 110 may be nonvolatile memory such as NAND flash memory, 3D NAND flash memory and NOR flash memory. Furthermore, one part of the memory 110 included in the storage device 100 may be volatile memory, and the other part may be nonvolatile memory.

The memory 110 may be one of various types of memory such as resistive RAM, phase change memory, magnetoresistive memory, ferroelectric memory and spin transfer torque memory. The memory 110 may be processing-in-memory which includes a calculation function or a data processing function.

The memory 110 may include a plurality of storage blocks. Each of the plurality of storage blocks may include a plurality of memory cells. Two or more memory cells may constitute one page, and a plurality of pages may constitute one storage block. In the present specification, the memory 110 may also be referred to as a memory device.

The controller 120 may receive a command from the outside, and may control the operation of the memory 110 based on the received command. In addition, the controller 120 may control the operation of the memory 110 based on an internally generated command. In the present specification, a command which the controller 120 receives from the outside may be referred to as an external command, and a command which is generated inside the controller 120 may be referred to as an internal command.

The controller 120 may control the operation of the memory 110 based on the external command or the internal command. For example, the controller 120 may control an operation of writing data to the memory 110. The controller 120 may control an operation of reading data written to the memory 110. Data may be transmitted and received between the controller 120 and the memory 110.

Depending on the type of the memory 110, the controller 120 may control a data preservation operation (e.g., a refresh operation or a patrol scrub operation) or an erase operation on data written to the memory 110.

To maintain and improve the operation performance of the storage device 100, the controller 120 may perform a background operation associated with the memory 110 based on an external command received from an external host device 200 or based on an internal command. The background operation may include, for example, at least one of garbage collection, wear leveling, read reclaim and bad block management operations. Through control of the background operation, the controller 120 may improve the operation performance of the storage device 100 or prevent the operation performance from deteriorating.

The controller 120 may control the operation of the memory 110 based on a command received from the host device 200. The controller 120 may provide the host device 200 with a processing result according to an operation corresponding to the command. The controller 120 may transmit data or a response signal to the host device 200.

For example, the host device 200 may be a computer, an ultra mobile PC (UMPC), a workstation, a personal digital assistant (PDA), a tablet, a mobile phone, a smartphone, a wearable device, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a telematics network, a radio frequency identification (RFID) device, a mobility device (e.g., a vehicle, a robot or a drone) capable of traveling under human control or autonomous driving, or the like. Alternatively, the host device 200 may be a virtual/augmented reality (VR/AR) device which provides a 2D or 3D virtual reality image or augmented reality image. The host device 200 may be any of various electronic devices each of which requires the storage device 100 capable of storing data.

The host device 200 may include at least one operating system (OS). The operating system may manage and control overall functions and operations of the host device 200, and may control an interoperation between the host device 200 and the storage device 100. The operating system may be classified into a general operating system and a mobile operating system depending on the mobility of the host device 200.

The controller 120 and the host device 200 may be devices which are separated from each other. The controller 120 and the host device 200 may be implemented by being integrated as one device, or some components or functions of the controller 120 may be implemented by being included in the host device 200. Hereunder, it will be described that the controller 120 and the host device 200 are devices which are separated from each other.

Figure 2:
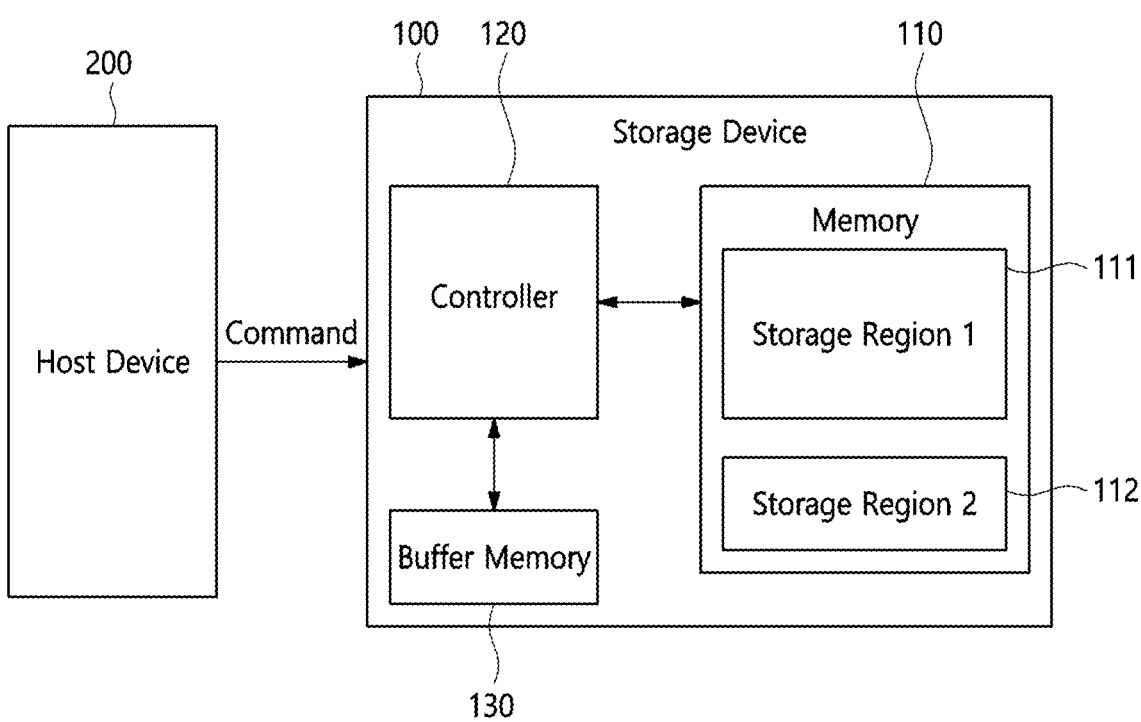
FIG. 2 is a diagram illustrating a method in which the storage device according to an embodiment of the present disclosure processes a command from a host device.

FIG. 2 is a diagram illustrating a method in which the storage device 100 according to the embodiment of the present disclosure processes a command from the host device 200.

Referring to FIG. 2, the storage device 100 may receive a command from the host device 200 and perform an operation according to the command. The host device 200 may transmit the command to the storage device 100, and may transmit a logical block address according to the command. The logical block address may be, for example, an address for indicating data to be managed by the host device 200.

The host device 200 may transmit, to the storage device 100, the command and the logical block address to request processing of the command. When the command is a write command, the host device 200 may further transmit data to be written to the storage device 100.

When the command is received from the host device 200, the controller 120 of the storage device 100 may control an operation of processing the command based on the command and the logical block address according to the command.

For example, the controller 120 may generate and manage a mapping table which includes mapping information between the logical block address by the host device 200 and a physical block address of the memory 110.

For example, the physical block address may be an address which indicates a storage region where data is to be stored in the memory 110. For example, the physical block address may indicate a page which constitutes a storage block. In this case, the physical block address may include a number indicating the memory 110 included in the storage device 100, a number indicating a bank or a storage block in the memory 110 and a number indicating a page in the storage block, but the embodiments of the present disclosure are not limited thereto. The physical block address may correspond to a part of storage regions included in the memory 110, and may be composed of one of various forms which may indicate a corresponding storage region.

The controller 120 may store and manage data in the storage region corresponding to the physical block address mapped to the logical block address by the host device 200.

For example, the memory 110 may include a first storage region 111 which stores data by the host device 200. The first storage region 111 may include a plurality of storage blocks each of which is composed of a plurality of pages. The controller 120 may store and manage data by the host device 200 in the first storage region 111 of the memory 110.

The memory 110 may include a second storage region 112 which is distinguished from the first storage region 111. For example, the controller 120 may store and manage a mapping table in the second storage region 112. When a command is received from the host device 200, the controller 120 may process the command using a mapping table which is stored in the second storage region 112 of the memory 110. In addition to the mapping table, the second storage region 112 may store other information required to be stored and manage data. In the present specification, the first storage region 111 may be referred to as a data storage region, and the second storage region 112 may be referred to as a mapping table storage region.

For example, the controller 120 may load a mapping table stored in the second storage region 112 of the memory 110 into a buffer memory 130. The buffer memory 130 may be, for example, volatile memory, but the embodiments are not limited thereto. The buffer memory 130 may be located outside the controller 120 as shown in FIG. 2. The buffer memory 130 may be located inside the controller 120. In the present specification, the memory 110 may be referred to as first memory, and the buffer memory 130 may be referred to as second memory.

The controller 120 may perform processing of a command from the host device 200 by loading all or a part of mapping tables stored in the memory 110 into the buffer memory 130.

For example, when a command is received from the host device 200, the controller 120 may check, from a mapping table, a physical block address mapped to a logical block address according to the command. The controller 120 may perform a write operation or a read operation according to the command on a storage region corresponding to the checked physical block address.

The controller 120 may process a command using one mapping table including mapping information between a logical block address and a physical block address but may also process a command using at least two mapping tables for efficient processing of the command.

FIG. 3 is a diagram illustrating structures of mapping tables managed in the storage device 100 according to the embodiment of the present disclosure.

Referring to FIG. 3, the memory 110 may include a plurality of storage regions which store data. Each storage region may correspond to a physical block address. For example, a storage region #0, . . . and a storage region #3 may correspond to physical block addresses #0, . . . and #3, respectively. The physical block addresses #0, . . . and #3 may indicate the storage region #0, . . . and the storage region #3, respectively.

A first mapping table Mapping Table 1 may include mapping information between first logical block addresses LBA1 and physical block addresses PBA.

A first logical block address LBA1 may be an address corresponding to a logical block address which is transmitted according to a command of the host device 200. The first logical block addresses may be composed of, for example, LBA1 #0, . . . and LBA1 #10000, but the embodiments are not limited thereto.

A physical block address PBA may mean a physical block address which indicates a storage region of the memory 110. A physical block address may be mapped to correspond to a first logical block address. Only some of the first logical block addresses may be mapped to physical block addresses, and physical block addresses mapped to some of the first logical block addresses may be invalid.

Using the first mapping table Mapping Table 1, mapping information between a logical block address by the host device 200 and a physical block address of the memory 110 may be provided.

The controller 120 may process a command of the host device 200 while managing a second mapping table Mapping Table 2 in addition to the first mapping table.

The second mapping table Mapping Table 2 may include mapping information between second logical block addresses LBA2 and temporary logical block addresses TLBA.

A second logical block address LBA2 may be an address corresponding to a logical block address which is transmitted according to a command of the host device 200. The second logical block addresses may be composed of, for example, LBA2 #0, . . . and LBA2 #10000, but the embodiments are not limited thereto.

The form of a second logical block address may be the same as the form of a first logical block address. The number of the second logical block addresses may be the same as the number of the first logical block addresses. Like a first logical block address, a second logical block address may be an address corresponding to a logical block address which is indicated by the host device 200.

A temporary logical block address TLBA mapped to a second logical block address may be an address which matches a first logical block address of the first mapping table. Matched addresses may mean addresses which are the same or may correspond to each other.

For example, a temporary logical block address TLBA may have the same value as a first logical block address. A temporary logical block address TLBA #0 may be the same as the first logical block address LBA1 #0. By a temporary logical block address mapped to a second logical block address in the second mapping table, a first logical block address of the first mapping table may be indicated.

The controller 120 may process a command of the host device 200 by comparing a logical block address according to the command with a first logical block address LBA1 of the first mapping table or a second logical block address LBA2 of the second mapping table.

For example, when comparing the logical block address by the host device 200 with the first mapping table, the controller 120 may perform an operation according to the command on a storage region indicated by a physical block address mapped to a first logical block address of the first mapping table, which matches the logical block address of the host device 200.

When comparing the logical block address of the host device 200 with the second mapping table, the controller 120 may check a temporary logical block address TLBA mapped to a second logical block address LBA2 of the second mapping table, which matches the logical block address of the host device 200. The controller 120 may perform an operation according to the command on a storage region indicated by, in the first mapping table, a physical block address PBA mapped to a first logical block address LBA1, which matches the temporary logical block address TLBA in the second mapping table.

By managing a physical block address mapped to a logical block address of the host device 200 using the first mapping table and the second mapping table, the controller 120 may efficiently control the internal operation of the storage device 100 when processing a command of the host device 200.

Figure 4:
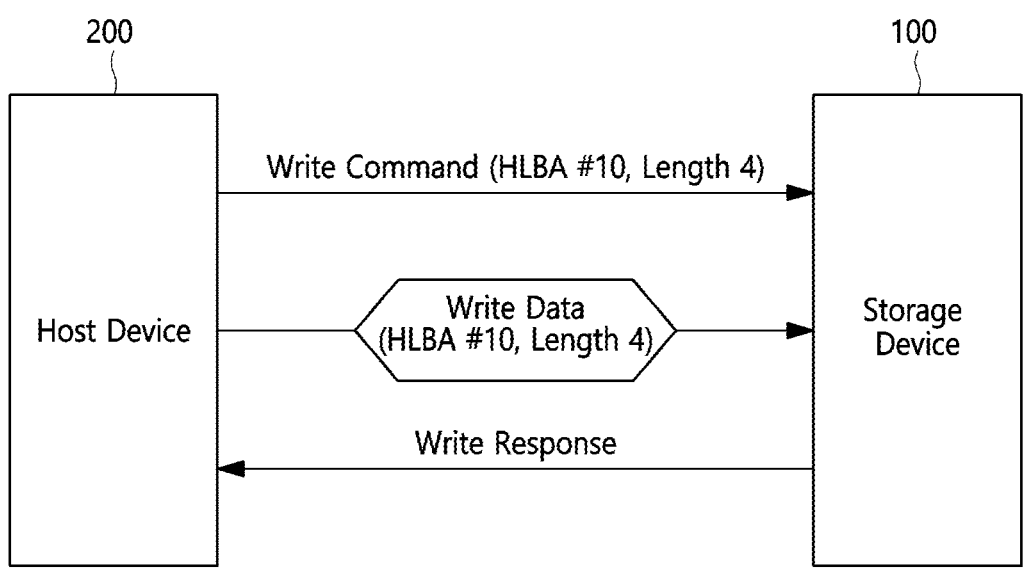
FIGS. 4 and 5 are diagrams illustrating a method in which a write command is processed in the storage device according to an embodiment of the present disclosure.
Figure 5:
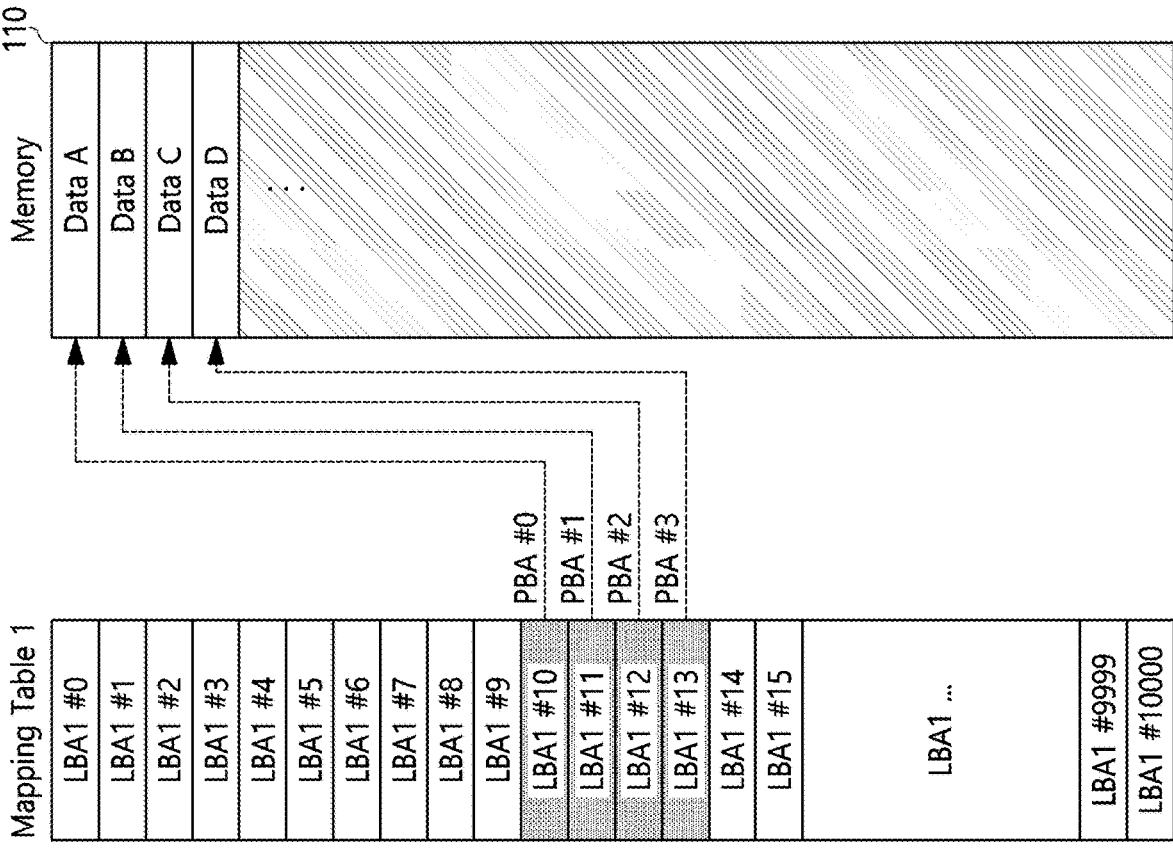

FIGS. 4 and 5 are diagrams illustrating a method in which a write command is processed in the storage device 100 according to the embodiment of the present disclosure.

Referring to FIG. 4, the host device 200 may transmit to the storage device 100 a command which requests to write data. For example, the host device 200 may transmit a write command, and may transmit to the storage device 100 information on a logical block address and a data length. The logical block address transmitted by the host device 200 may be referred to as a host logical block address HLBA, and the host logical block address may mean an address which may match a first logical block address of the above-described first mapping table or a second logical block address of the above-described second mapping table.

For example, when transmitting the write command, the host device 200 may transmit information on a host logical block address HLBA #10 and information on a data length 4. After transmitting the write command, the host device 200 may transmit to the storage device 100 data to be written. When a predetermined time elapses after transmitting the write command, the host device 200 may transmit the data to the storage device 100. Alternatively, after receiving from the storage device 100 a write ready signal corresponding to the write command, the host device 200 may transmit data to the storage device 100.

After writing the data to the memory 110 according to the command of the host device 200, the storage device 100 may transmit a write response signal to the host device 200. When writing the data according to the command of the host device 200, the storage device 100 may generate and manage mapping information between the host logical block address by the host device 200 and a physical block address of the memory 110.

Referring to FIG. 5, a state before mapping information of the second mapping table is generated by the controller 120 is illustrated as an example. This state may represent a state before receiving, from the host device 200, a copy command which will be described later. Alternatively, the state may represent after mapping information of the second mapping table is deleted by an internal operation although the mapping information of the second mapping table is generated by the controller 120.

In this way, when mapping information of the second mapping table does not exist, the second mapping table may be regarded as being in a deactivated state. When the second mapping table is in a deactivated state, the controller 120 may process the write command of the host device 200 by first checking the first mapping table. A deactivated state or an activated state of the second mapping table may be set and managed through a separate flag.

In a state in which mapping information of the second mapping table does not exist, when a write command is received from the host device 200, the controller 120 may check a host logical block address and a data length according to the write command.

Based on the host logical block address #10 by the host device 200, the controller 120 may manage a first logical block address LBA1 #10 of the first mapping table as an address which matches the host logical block address HLBA #10. Since the data length according to the write command is 4, the controller 120 may manage first logical block addresses LBA1 #10 to #13 by matching them to host logical block addresses HLBA #10 to #13.

The controller 120 may allocate a physical block address to a first logical block address which matches a host logical block address. A physical block address which indicates a storage region of the memory 110 may be allocated to be mapped to the first logical block address. For example, physical block addresses PBA #0, #1, #2 and #3 may be allocated to be mapped to the first logical block addresses LBA1#10, #11, #12 and #13, respectively.

The controller 120 may update mapping information between a first logical block address and a physical block address in the first mapping table, and may write data according to a command of the host device 200 to a storage region indicated by the corresponding physical block address. In FIG. 5, Data A, Data B, Data C and Data D may be written to storage regions indicated by the physical block addresses PBA #0, #1, #2 and #3. Data A, Data B, Data C and Data D may be data managed by the host logical block addresses HLBA #10, #11, #12 and #13, respectively.

The controller 120 may perform a write operation and manage storage regions where data are written, while updating mapping information of the first mapping table according to the write command of the host device 200.

The controller 120 may perform an operation according to each of various commands received from the host device 200 while managing a mapping table according to each of the various commands. The controller 120 may perform an operation according to each of various commands using only the first mapping table as in the above-described example or using the first mapping table and the second mapping table.

Figure 6:
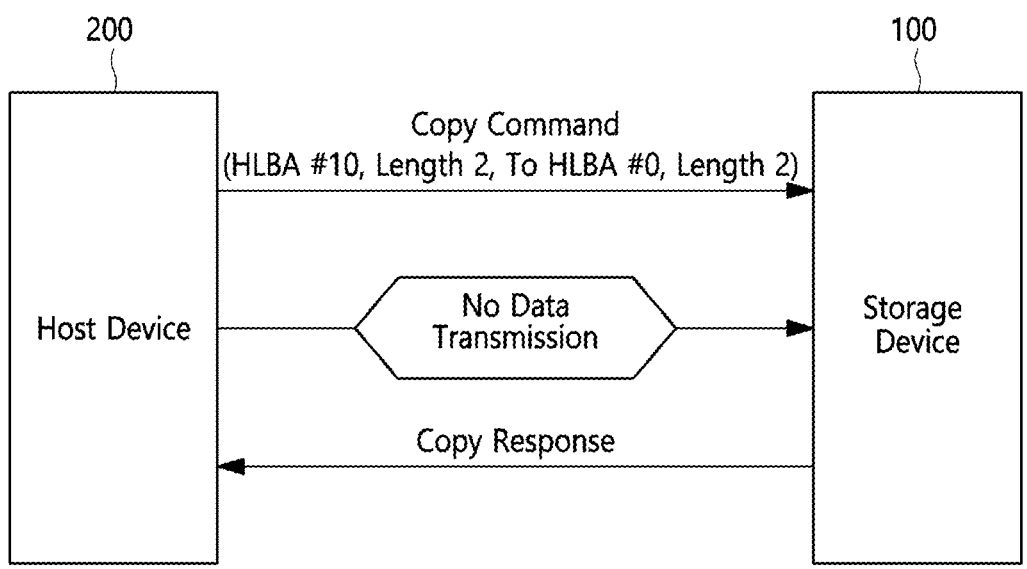
FIGS. 6 and 7 are diagrams illustrating a method in which a copy command is processed in the storage device according to an embodiment of the present disclosure.
Figure 7:
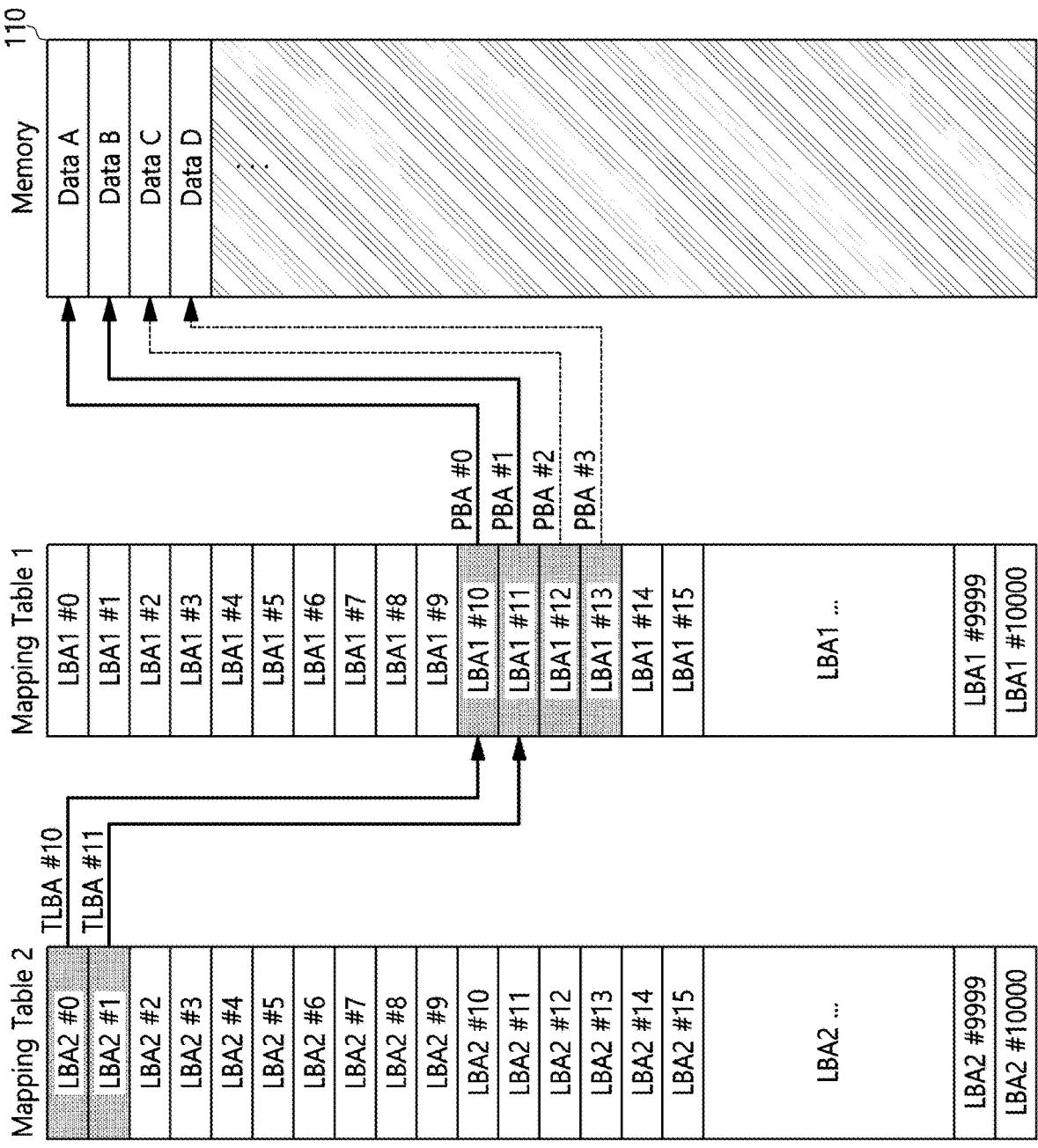

FIGS. 6 and 7 are diagrams illustrating a method in which a copy command is processed in the storage device 100 according to an embodiment of the present disclosure.

Referring to FIG. 6, the host device 200 may transmit to the storage device 100 a copy command which requests to copy data of a first host logical block address to a second host logical block address.

For efficient management of data, the host device 200 may perform an operation of changing a host logical block address which indicates data. When changing a host logical block address which indicates data, the host device 200 may transmit, to the storage device 100, information on a changed host logical block address.

For example, the host device 200 may transmit, to the storage device 100, a copy command which instructs to copy data indicated by a host logical block address HLBA #10 and corresponding to a data length 2 to a host logical block address HLBA #0. The form of host logical block addresses and data lengths transmitted according to the copy command may be a form which includes, for example, a first host logical block address, a data length, a second host logical block address and a data length as illustrated in FIG. 6, but the embodiments are not limited thereto.

In response to the copy command from the host device 200, the storage device 100 may perform an operation of changing the first host logical block address to the second host logical block address inside the storage device 100. Since the changing operation is performed inside the storage device 100, data transmission and reception between the storage device 100 and the host device 200 for copying data indicated by the first host logical block address to the second host logical block address may not occur.

When the operation of changing the data indicated by the first host logical block address to be indicated by the second host logical block address is completed, the storage device 100 may transmit a copy response signal to the host device 200. For example, the storage device 100 may process the copy command of the host device 200 using the first mapping table and the second mapping table.

Referring to FIG. 7, when the copy command of the host device 200 is received, the controller 120 may check the first host logical block address LBA1 and the second host logical block address LBA2 according to the copy command.

The controller 120 may check a second logical block address LBA2 which matches the second host logical block address in the second mapping table. For example, since the second host logical block address according to the copy command of the host device 200 is LBA2 #0 and the data length is 2, the controller 120 may manage second logical block addresses LBA2 #0 and #1 in the second mapping table as second host logical block addresses to which the data is to be moved according to the copy command.

The controller 120 may map a temporary logical block address TLBA to each of the second logical block addresses LBA2 #0 and #1 of the second mapping table. A temporary logical block address TLBA may be an address which matches a first logical block address matching the first host logical block address according to the copy command of the host device 200.

For example, since the first host logical block address according to the copy command of the host device 200 is #10 and the data length is 2, first logical block addresses LBA1 #10 and #11 may match first host logical block addresses. The controller 120 may update the second mapping table so that temporary logical block addresses TLBA which match the first logical block addresses LBA1 #10 and #11 are mapped to the second logical block addresses LBA2 #0 and #1 of the second mapping table.

According to the update of the second mapping table, the second logical block addresses LBA2 #0 and #1 of the second mapping table may indicate the first logical block addresses LBA1 #10 and #11 of the first mapping table through the mapped temporary logical block addresses. The first logical block addresses LBA1 #10 and #11 of the first mapping table may maintain mapping relationships with physical block addresses PBA #0 and #1. The first logical block addresses LBA1 #10 and #11 may indicate Data A and Data B which are written to the storage regions indicated by the physical block addresses PBA #0 and #1.

By the mapping information of the second mapping table and the first mapping table, the data indicated by the host logical block addresses #0 and #1 may be managed as Data A and Data B. Data A and Data B which are the data indicated by the host logical block addresses #10 and #11 before the copy command is received may be managed as being indicated by the new host logical block addresses #0 and #1.

When the controller 120 performs an operation according to a copy command from the host device 200, data of the memory 110 as a target of the copy command may not be moved. When the operation according to the copy command is performed by the controller 120, the first mapping table may maintain mapping information and may not be changed.

Since the controller 120 performs the operation according to the copy command by the host device 200 while updating only the mapping information of the second mapping table, the efficiency of processing the copy command may be improved.

When various commands are received from the host device 200 after the second mapping table is updated according to the processing of the copy command, the controller 120 may perform operations according to the commands using the first mapping table and the second mapping table.

Figure 8:
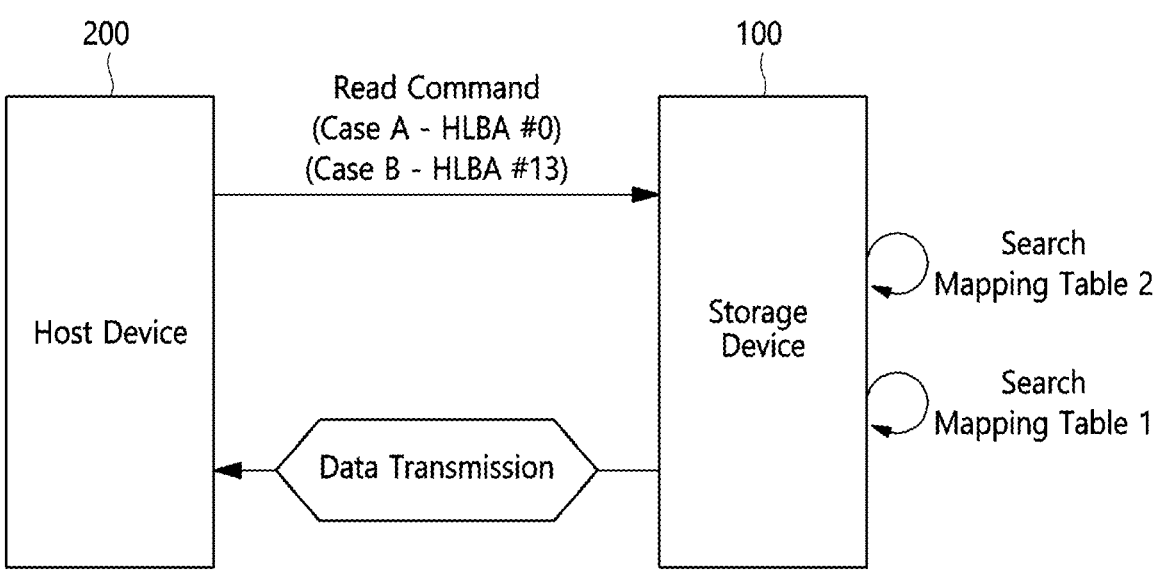
FIGS. 8 and 9 are diagrams illustrating a method in which a read command is processed in the storage device according to an embodiment of the present disclosure.
Figure 9:
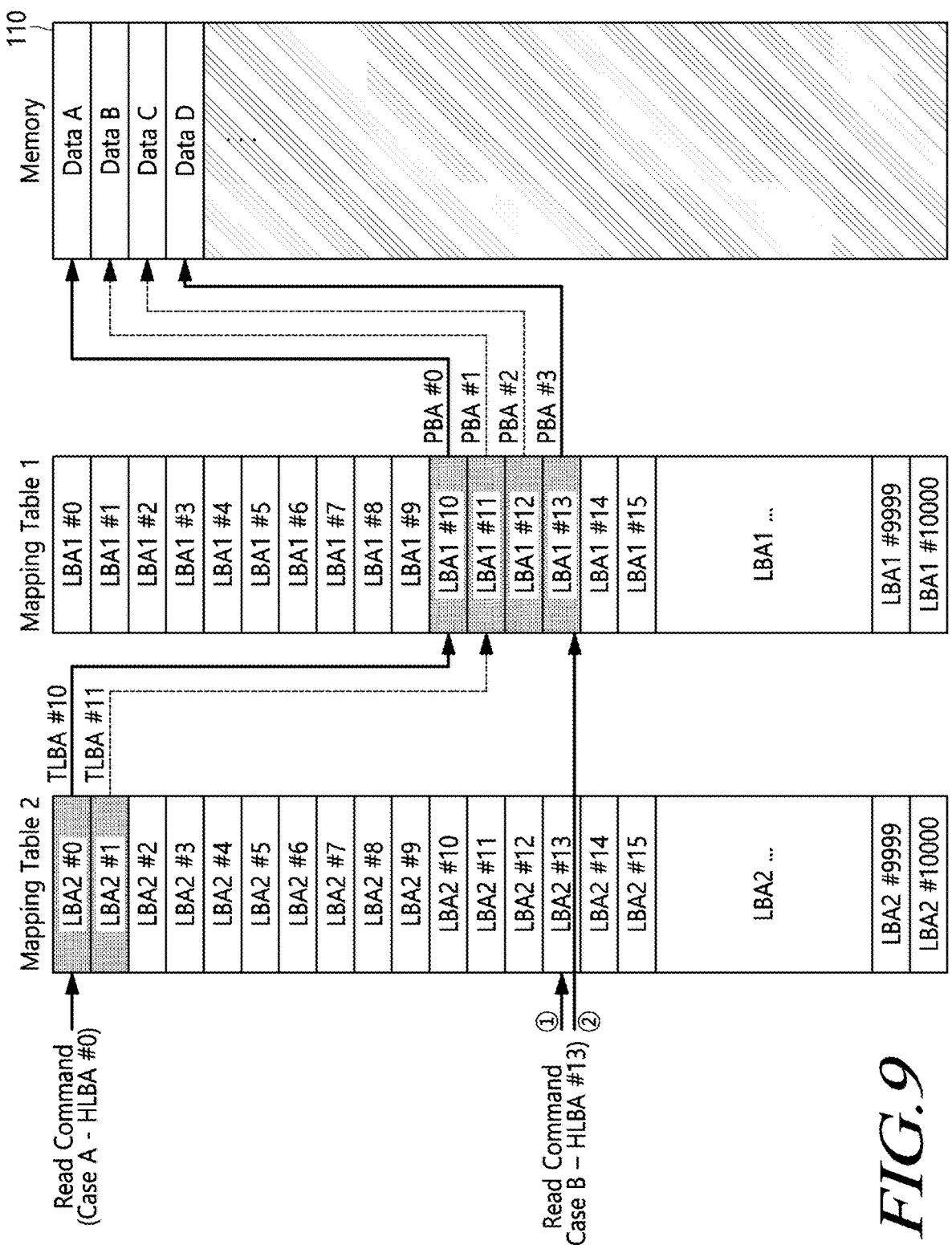

FIGS. 8 and 9 are diagrams illustrating a method in which a read command is processed in the storage device 100 according to the embodiment of the present disclosure.

Referring to FIG. 8, an embodiment in which the storage device 100 receives a read command from the host device 200 and processes the read command is illustrated. FIG. 8 illustrates an embodiment of a case where the storage device 100 receives and processes a read command after a copy command is received from the host device 200 and processes the copy command, and illustrates a case where mapping information exists in the second mapping table.

The host device 200 may transmit to the storage device 100 a read command and a host logical block address HLBA according to the read command. Although not illustrated in FIG. 8, the host device 200 may transmit, to the storage device 100, information on a data length together with the host logical block address HLBA.

For example, the host device 200 may transmit to the storage device 100 a command which requests to read data for a host logical block address HLBA #0 (Case A). For another example, the host device 200 may transmit to the storage device 100 a command which requests to read data for a host logical block address HLBA #13 (Case B). The host device 200 may transmit to the storage device 100 information on a data length according to each read command.

When a read command is received from the host device 200, the storage device 100 may perform a read operation using the first mapping table and the second mapping table.

For example, the storage device 100 may search the second mapping table to check a second logical block address which matches a host logical block address according to the read command. The storage device 100 may check whether a temporary logical block address which is mapped to the second logical block address exists or is valid.

Then, the storage device 100 may search the first mapping table. When a temporary logical block address which is mapped to the second logical block address in the second mapping table is valid, the storage device 100 may perform a read operation on a storage region indicated by a physical block address mapped to a first logical block address of the first mapping table which matches the temporary logical block address.

When a temporary logical block address which is mapped to the second logical block address in the second mapping table is invalid, the storage device 100 may perform a read operation on a storage region indicated by a physical block address mapped to a first logical block address of the first mapping table which matches the host logical block address.

The storage device 100 may transmit to the host device 200 data read using the second mapping table and the first mapping table.

As a specific example, referring to FIG. 9, in Case A, there exists a temporary logical block address TLBA #10 mapped to a second logical block address LBA2 #0 of the second mapping table which matches the host logical block address HLBA #0 according to a read command. The controller 120 may check whether the temporary logical block address TLBA #10 mapped to the second logical block address LBA2 #0 exists, or may check whether the temporary logical block address TLBA #10 is mapped, through a valid flag which is set for the second logical block address LBA2 #0.

The controller 120 may check a first logical block address LBA1 #10 of the first mapping table which matches the temporary logical block address TLBA #10 mapped to the second logical block address LBA2 #0. The controller 120 may read data written to a storage region indicated by a physical block address PBA #0 mapped to the first logical block address LBA1 #10, and may provide the read data to the host device 200.

In Case B, the controller 120 may check mapping information of a second logical block address LBA2 #13 of the second mapping table which matches the host logical block address HLBA #13 according to a read command (①).

A temporary logical block address TLBA which is mapped to the second logical block address LBA2 #13 may not exist. Alternatively, a temporary logical block address TLBA which is mapped to the second logical block address LBA2 #13 may have an invalid value. Alternatively, a valid flag which is set for the second logical block address LBA2 #13 may be set to an invalid value.

When it is checked that a temporary logical block address TLBA mapped to the second logical block address LBA2 #13 is invalid, the controller 120 may check the mapping information of a first logical block address LBA1 #13 of the first mapping table which matches the host logical block address HLBA #13 (②).

The controller 120 may check a physical block address PBA #3 which is mapped to the first logical block address LBA1 #13 in the first mapping table. The controller 120 may read data of a storage region indicated by the physical block address PBA #3 in the memory 110, and may provide the read data to the host device 200.

When mapping information of the second mapping table exists according to processing of a copy command from the host device 200, the controller 120 may perform an operation according to the read command of the host device 200 while checking the mapping information of the second mapping table and the first mapping table as in the above-described example.

While managing the second mapping table according to a copy command, the controller 120 may control an operation of merging the second mapping table and the first mapping table at a preset time point.

Figure 10:
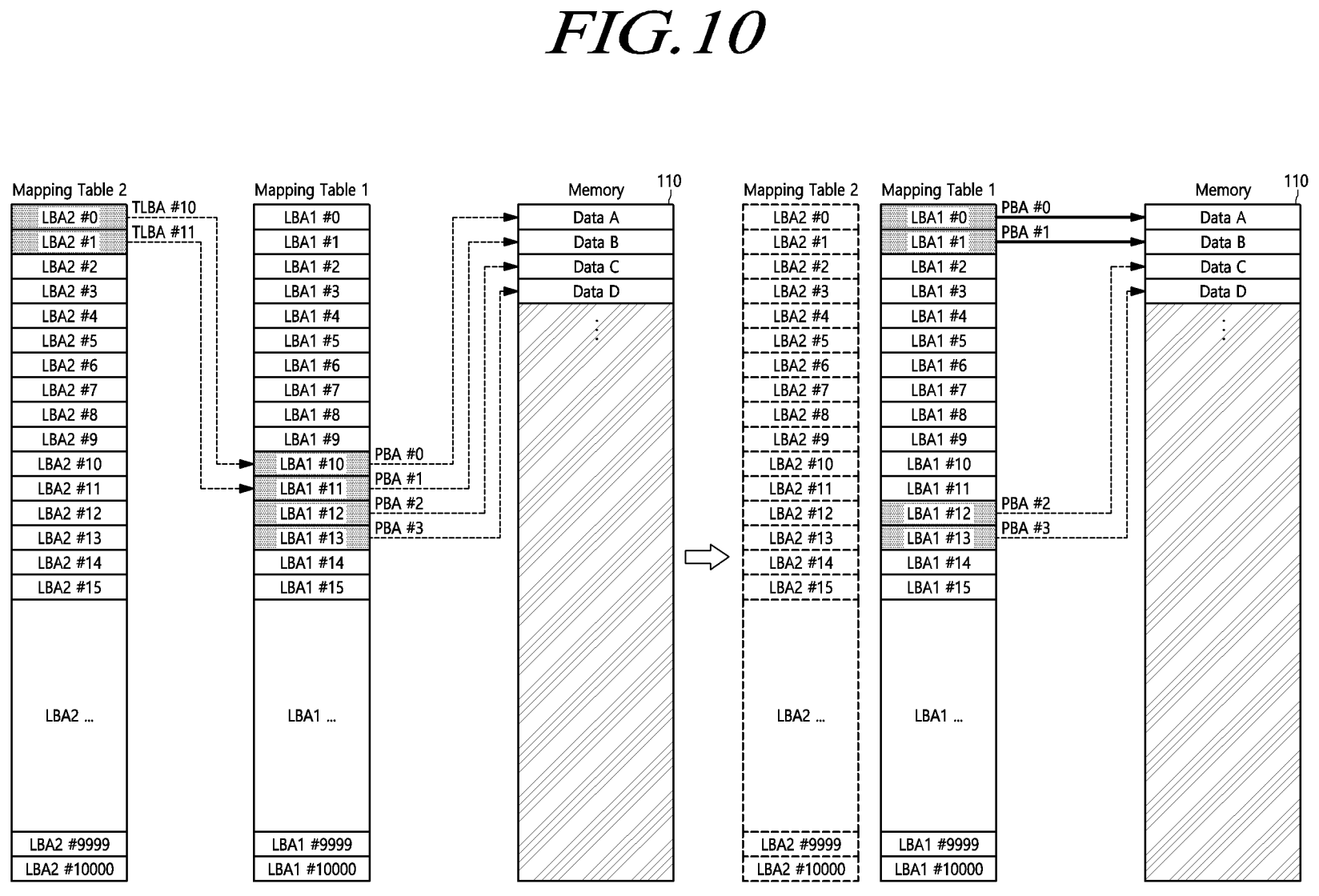

FIG. 10 is a diagram illustrating a method in which mapping tables are managed in the storage device 100 according to the embodiment of the present disclosure.

Referring to FIG. 10, as a copy command by the host device 200 is processed, mapping information may be generated for second logical block addresses LBA2 #0 and #1 of the second mapping table.

At a preset time point, the controller 120 may perform an operation of merging the mapping information of the second mapping table with the mapping information of the first mapping table.

The preset time point may be, for example, a time point included in an idle period during which a command is not received from the host device 200. When the idle period occurs, the controller 120 may perform, as a background operation, an operation of merging the second mapping table into the first mapping table.

Alternatively, the preset time point may mean a time point before the controller 120 stores the first mapping table and the second mapping table in the memory 110. Before storing the mapping information of the first mapping table and the second mapping table in the memory 110, the controller 120 may perform an operation of merging the first mapping table and the second mapping table. After merging the first mapping table and the second mapping table, the controller 120 may store only the first mapping table in the memory 110, or may store the first mapping table and the second mapping table in the memory 110.

Alternatively, the preset time point may mean before the controller 120 receives a write command including a host logical block address which matches a temporary logical block address mapped to a second logical block address in the second mapping table. Since the host device 200 manages data of a specific host logical block address by moving the data to another host logical block address through a copy command, the specific host logical block address may be recognized as an empty state. A command which requests to write data to the empty host logical block address may be received from the host device 200. Since the corresponding host logical block address is in a state in which it is mapped to a physical block address by the first mapping table, it may be difficult to perform an operation of writing data to the corresponding host logical block address. The controller 120 may merge the first mapping table and the second mapping table to release the mapping information of the first logical block address which matches the corresponding host logical block address, and may perform an operation according to the write command.

The preset time point is not limited to the above-described examples. At a time point required by a request from the host device 200 or an internal state of the storage device 100 in a state in which mapping information exists in the second mapping table, an operation of merging the first mapping table and the second mapping table may be performed.

The controller 120 may update the first mapping table such that a physical block address mapped to a first logical block address of the first mapping table which matches a temporary logical block address mapped to a second logical block address of the second mapping table is mapped to a first logical block address of the first mapping table which matches the second logical block address.

For example, the controller 120 may update the first mapping table such that a physical block address PBA #0 mapped to a first logical block address LBA1 #10 of the first mapping table which matches a temporary logical block address TLBA #10 mapped to a second logical block address LBA2 #0 of the second mapping table is mapped to a first logical block address LBA1 #0 of the first mapping table.

After updating the mapping information of the first logical block address LBA1 #0 and the physical block address PBA #0, the controller 120 may delete the mapping information of the first logical block address LBA1 #10 and the mapping information of the second logical block address LBA2 #0.

Similarly, the controller 120 may delete the mapping information of a second logical block address LBA2 #1 in the second mapping table and the mapping information of a first logical block address LBA1 #11 in the first mapping table, and may update the first mapping table such that a first logical block address LBA1 #1 is mapped to a physical block address PBA #1.

When merging of the first mapping table and the second mapping table is completed, the controller 120 may manage the second mapping table in a deactivated state, which is shown in the dotted box of FIG. 10.

The controller 120 may process a write command or a read command from the host device 200 using only the first mapping table before receiving a copy command from the host device 200.

As in the above-mentioned example, when receiving a write command for a host logical block address which matches a first logical block address whose mapping information exists, the controller 120 may process the write command after performing merge of the first mapping table and the second mapping table. The controller 120 may process the write command using a first logical block address which is not mapped to a physical block address.

Figure 11:
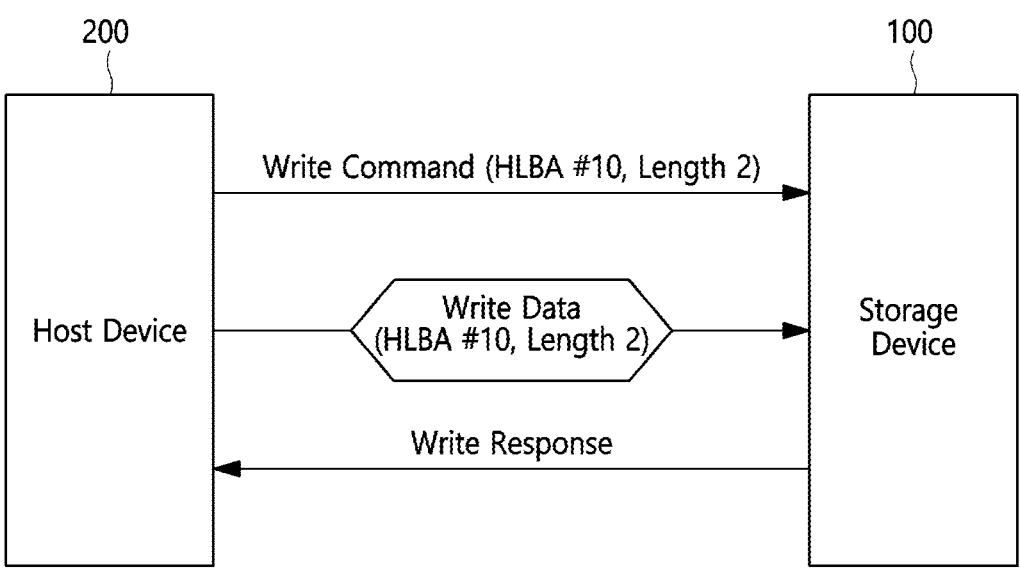
FIGS. 11 and 12 are diagrams illustrating another method in which a write command is processed in the storage device according to an embodiment of the present disclosure.
Figure 12:
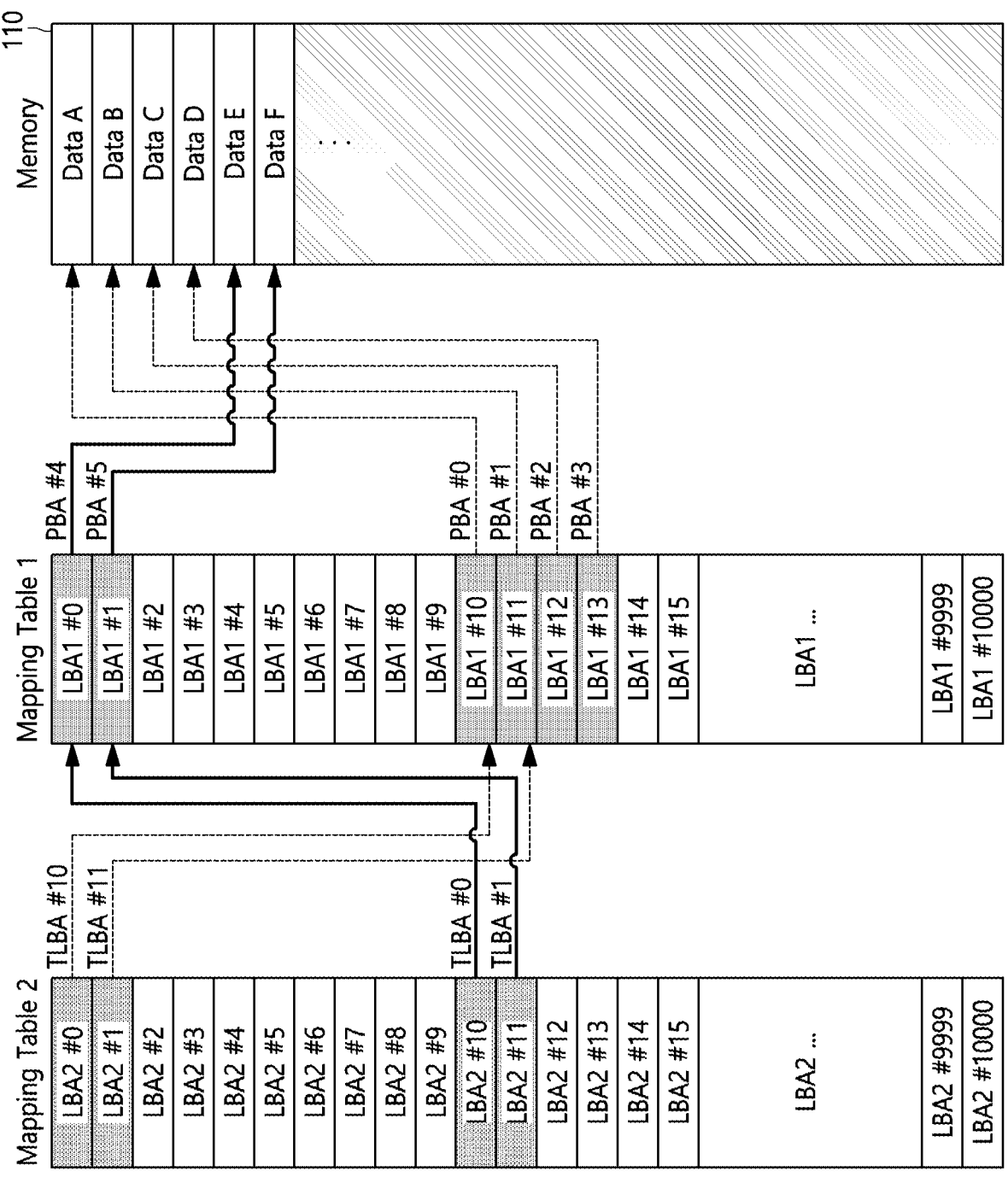

FIGS. 11 and 12 are diagrams illustrating another method in which a write command is processed in the storage device 100 according to the embodiment of the present disclosure.

Referring to FIGS. 11 and 12, the storage device 100 may receive a write command from the host device 200. For example, after the mapping relationship between a second logical block address LBA2 of the second mapping table and a first logical block address LBA1 of the first mapping table is generated according to a copy command from the host device 200, the storage device 100 may receive a write command from the host device 200.

In a case where a host logical block address HLBA according to the write command of the host device 200 corresponds to a logical block address which is not mapped by the first mapping table and the second mapping table, the storage device 100 may map a physical block address PBA to a first logical block address LBA1 which matches the host logical block address HLBA, and may perform a write operation on a storage region which is indicated by the corresponding physical block address PBA.

When receiving a write command for a host logical block address which matches a first logical block address LBA1 for which mapping information of the first mapping table exists, the storage device 100 may perform an operation according to the write command while generating mapping information of the first mapping table and the second mapping table.

For example, the storage device 100 may receive, from the host device 200, a write command which indicates a host logical block address HLBA #10 and a data length 2.

The controller 120 may check, in the first mapping table, mapping information of a first logical block address LBA1 #10 which matches the host logical block address HLBA #10.

Since the first logical block address LBA1 #10 is generated with a mapping relationship with the second mapping table by a copy command of the host device 200, a physical block address which is mapped to the first logical block address LBA1 #10 may exist. By moving data of the first logical block address LBA1 #10 to a first logical block address LBA1 #0 through a copy command, the host device 200 may transmit, to the storage device 100, a write command which instructs to write data to the first logical block address LBA1 #10.

As in the example described above with reference to FIG. 10, after merging the first mapping table and the second mapping table, the controller 120 may process the write command from the host device 200 for the host logical block address HLBA #10.

Alternatively, by generating mapping information using an empty first logical block address in the first mapping table, the controller 120 may process the write command from the host device 200.

For example, the controller 120 may generate mapping information of a second logical block address LBA2 #10 of the second mapping table which matches the host logical block address HLBA #10 according to the write command of the host device 200. The controller 120 may map the second logical block address LBA2 #10 to a temporary logical block address TLBA #0 which matches the first logical block address LBA1 #0. By the second mapping table, the second logical block address LBA2 #10 may indicate the first logical block address LBA1 #0.

The controller 120 may map a physical block address PBA #4 to the first logical block address LBA1 #0 and allocate a storage region which is indicated by the physical block address PBA #4. The controller 120 may write data E according to the write command of the host device 200 to the allocated storage region.

Similarly, the controller 120 may map a second logical block address LBA2 #11 to a first logical block address LBA1 #1, may allocate a physical block address PBA #5, and may store data F in a storage region which is indicated by the physical block address PBA #5.

When mapping information exists in second logical block addresses LBA2 #0 and #1 in the second mapping table according to a copy command, mapping information of the first logical block addresses LBA1 #0 and #1 which match the second logical block addresses LBA2 #0 and #1 may not exist, or mapped physical block addresses may be invalid. Since the host device 200 manages host logical block addresses HLBA #0 and #1 as a state in which data are written thereto, the host device 200 may not transmit a command which requests to write data to the host logical block addresses HLBA #0 and #1.

Since the first logical block addresses LBA1 #0 and #1 of the first mapping table which match the second logical block addresses LBA2 #0 and #1 where mapping information exists in the second mapping table are in an empty state, by using the empty first logical block addresses LBA1 #0 and #1 and the second logical block addresses LBA2 #10 and #11 which match host logical block addresses HLBA, the write command of the host device 200 may be processed without merging the first mapping table and the second mapping table.

When processing the write command of the host device 200, delay due to merging of the first mapping table and the second mapping table may be reduced, and the controller 120 may perform an operation of merging the first mapping table and the second mapping table at a preset time point such as a time point during an idle period after processing of the write command is completed.

Although various embodiments of the present disclosure have been described with particular specifics and varying details for illustrative purposes, those skilled in the art will appreciate that various modifications, additions and substitutions may be made based on what is disclosed or illustrated in the present disclosure without departing from the spirit and scope of the present disclosure as defined in the following claims. Furthermore, the embodiments may be combined to form additional embodiments.

What is claimed is:

1. A storage device comprising:
   a memory including a plurality of storage regions, the plurality of storage regions corresponding to physical block addresses, respectively; and
   a controller configured to:
   update a first mapping table and a second mapping table, the first mapping table including mapping information between first logical block addresses and the physical block addresses, the second mapping table including mapping information between second logical block addresses and temporary logical block addresses corresponding to the first logical block addresses of the first mapping table,
   determine a physical block address corresponding to host logical block address by comparing the host logical block address according to an operation command received from a host device with at least one of the first logical block addresses of the first mapping table or the second logical block addresses of the second mapping table, and
   perform an operation according to the operation command based on the physical block address.

2. The storage device according to claim 1, wherein the controller receives, from the host device, a copy command, a first host logical block address and a second host logical block address, and
   updates the second mapping table such that a temporary logical block address corresponding to a second logical block address which matches the second host logical block address among the second logical block addresses of the second mapping table is mapped to a first logical block address which matches the first host logical block address among the first logical block addresses of the first mapping table.

3. The storage device according to claim 2, wherein the controller maintains, in response to the copy command, data stored in a storage region among the plurality of storage regions corresponding to a physical block address mapped to the first logical block address which matches the first host logical block address.

4. The storage device according to claim 2, wherein the controller maintains the first mapping table in response to the copy command.

5. The storage device according to claim 2, wherein when the operation command is received from the host device before receiving the copy command,
   the controller determines a first logical block address corresponding to the host logical block address by comparing the host logical block address according to the operation command with the first logical block addresses of the first mapping table, and
   performs the operation according to the operation command based on a physical block address which matches the determined first logical block address.

6. The storage device according to claim 1, wherein when the operation command is received from the host device,
   the controller determines a second logical block address corresponding to the host logical block address by comparing the host logical block address according to the operation command with the second logical block addresses of the second mapping table,
   checks whether a temporary logical block address mapped to the determined second logical block address is valid, and
   performs the operation according to the operation command.

7. The storage device according to claim 6, wherein when the temporary logical block address mapped to the determined second logical block address is valid,
   the controller determines a first logical block address corresponding to the valid temporary logical block address by comparing the valid temporary logical block address with the first logical block addresses of the first mapping table, and
   performs the operation according to the operation command on a storage region, among the plurality of storage regions, the storage region corresponding to a physical block address mapped to the determined first logical block address.

8. The storage device according to claim 6, wherein when the temporary logical block address mapped to the determined second logical block address is invalid,
   the controller determines a first logical block address corresponding to the host logical block address by comparing the host logical block address with the first logical block addresses of the first mapping table, and
   performs the operation according to the operation command on a storage region, among the plurality of storage regions, the storage region corresponding to a physical block address mapped to the determined first logical block address.

9. The storage device according to claim 6, wherein when the temporary logical block address mapped to the determined second logical block address is valid, the controller determines that a first logical block address corresponding to the determined second logical block address among the first logical block addresses of the first mapping table is not mapped to the physical block address, or determines that the physical block address mapped to the first logical block address is invalid.

10. The storage device according to claim 1, wherein the controller performs a merge operation of merging the first mapping table and the second mapping table, and updates the first mapping table such that a physical block address mapped to a first logical block address of the first mapping table which matches a temporary logical block address mapped to a second logical block address of the second mapping table is mapped to a first logical block address of the first mapping table which matches the second logical block address.

11. The storage device according to claim 10, wherein the controller updates the first mapping table such that a mapping relationship of the physical block address mapped to the first logical block address of the first mapping table which matches the temporary logical block address is released.

12. The storage device according to claim 10, wherein the controller performs the merge operation during an idle period in which a command is not received from the host device.

13. The storage device according to claim 10, wherein when receiving the operation command including the host logical block address corresponding to the first logical block address of the first mapping table which matches the temporary logical block address, the controller performs the merge operation before controlling the operation according to the operation command.

14. The storage device according to claim 10, wherein the controller stores the first mapping table in the memory after the merge operation is completed, or stores the first mapping table and the second mapping table in the memory after the merge operation is completed.

15. The storage device according to claim 1, wherein the controller manages the first and second mapping tables so that the number of the second logical block addresses of the second mapping table and the number of the first logical block addresses of the first mapping table are the same.

16. A memory device comprising:
a data storage region indicated by physical block addresses; and a mapping table storage region distinguished from the data storage region, and configured to store a first mapping table and a second mapping table, the first mapping table including mapping information between first logical block addresses and the physical block addresses, the second mapping table including mapping information between second logical block addresses and temporary logical block addresses corresponding to the first logical block addresses of the first mapping table.

17. The memory device according to claim 16, wherein at least some of the physical block addresses mapped to the first logical block addresses in the first mapping table are valid, and all of the temporary logical block addresses mapped to the second logical block addresses in the second mapping table are invalid.

18. The memory device according to claim 16, wherein when temporary logical block addresses mapped to second logical block addresses are valid, physical block addresses mapped to first logical block addresses which match the second logical block addresses are invalid.

19. A storage device comprising:
a first memory including storage regions corresponding to physical block addresses;
a second memory; and
a controller configured to:
read, from the first memory, a first mapping table and a second mapping table, the first mapping table including mapping information between first logical block addresses and the physical block addresses, the second mapping table including mapping information between second logical block addresses and temporary logical block addresses corresponding to the first logical block addresses of the first mapping table,
load the first mapping table and the second mapping table in the second memory,
determine a physical block address corresponding to the external logical block address by comparing an external logical block address according to an external command with at least one of the first logical block addresses of the first mapping table or the second logical block addresses of the second mapping table, and
process the external command based on the physical block address.

20. The storage device according to claim 19, wherein the controller is configured to, at a preset time point, update the mapping information of the first mapping table based on the mapping information of the second mapping table, delete the mapping information of the second mapping table, and store the first mapping table and the second mapping table in the first memory.

* * * * *